United States Patent [19]
Herder

[11] Patent Number: 6,032,971
[45] Date of Patent: Mar. 7, 2000

[54] FOLDING BICYCLE FRAME

[76] Inventor: Jaime Herder, 45 Malcom St., Perth, Australia

[21] Appl. No.: 09/023,068

[22] Filed: Feb. 13, 1998

[51] Int. Cl.[7] .................................................. B62K 15/00
[52] U.S. Cl. ........................................... 280/278; 280/287
[58] Field of Search ................................ 280/287, 281.1, 280/278

[56] References Cited

U.S. PATENT DOCUMENTS 4,448,437  5/1984  Montague ............................... 280/287

FOREIGN PATENT DOCUMENTS

| | | |
|---|---|---|
| 0108832 | 5/1984 | European Pat. Off. ............... 280/278 |
| 004232592 A1 | 3/1994 | Germany ............................... 280/278 |
| 419227 | 3/1947 | Italy ........................................ 280/278 |
| 435978 | 1/1975 | U.S.S.R. ................................. 280/278 |
| 2021055 | 11/1979 | United Kingdom ................... 280/278 |
| 2206320 | 1/1989 | United Kingdom ................... 280/278 |

*Primary Examiner*—Paul N. Dickson
*Assistant Examiner*—Daniel Yeagley

[57] ABSTRACT

A folding bicycle in which all the pivoting members have horizontally pivot axes and all the members are indirectly connected to a single collar that slides up and down a seat post. In order to achieve an open or closed state, the collar is made to slide along the post and is then secured by tightening a quick release lever on the collar. Two front tubes extending between the steering head and the lower part of the seat post are parallel.

8 Claims, 4 Drawing Sheets

FOLDING BICYCLE FRAME

FIELD OF THE INVENTION

This invention relates to bicycles and more specifically to pedal bicycles that are termed collapsible or foldable.

BACKGROUND

Bicycles were developed many decades ago and have adopted various forms since then. In recent decades, high density living and traffic congestion has produced a need for a collapsible bicycle. Such bicycle in a collapsed state occupies a small space to facilitate fitting it into cars, lifts and other confined spaces.

There have been numerous different forms of collapsible bicycles which are characterised by small wheels having a diameter of about 40–50 cms. The designs that have been previously developed are typically either hinged about a vertical axis in a mid region of a frame or they comprise numerous detachable and folding components. The shortcoming of these previous designs is that they are either; not very compact, offer an uncomfortable riding configuration, or take a long time to transform from the collapsed to expanded form.

The object of this invention is to provide a collapsible bicycle that can be readily collapsed or expanded without any disassembly and without the application of any tools. Furthermore the bicycle must be sufficiently robust to support the rider while traversing terrain typically encountered by commuters in cities and suburbs.

SUMMARY OF THE INVENTION

This invention is said to reside in a folding bicycle frame having members connected to a steering head and rear wheel stays, the relative position between the steering head and rear wheel stays being controlled directly or indirectly by a collar slideable along a seat post through members connected at pivotal joints having horizontal axes.

More specifically this invention is said to reside in a folding bicycle frame characterised by a seat post with upper and lower, front and rear struts pivoted about a lower portion of the seat post, the front end of the front struts being pivotally attached to a steering-head bracket, the lower rear strut or struts accepting a rear wheel and a substantially vertical spar pivotally interconnecting the upper rear strut to the lower rear strut or struts, a collar positionable along an upper portion of the seat post has front and rear connecting linkages that pivotally interconnect between the seat collar and the upper front and rear struts, so that sliding the collar along the seat tube changes the angle of the front and rear struts between open and folded states, and locking said seat collar at its lowermost or uppermost position fixes the frame in an open or folded state.

Preferably the forward struts are substantially parallel.

Preferably linkages engage the front and back upper struts at a distance of about 30 cms from the seat post ends of the struts.

Preferably the lower rear struts are plates pivoted about a crank hub and extend a short distance forward of the crank hub where between the lower front strut is pivotally attached.

Preferably a lever operated cam is used to tighten the collar over the seat post to enable firm positioning of the collar and quick release and tightening of the collar.

Preferably the upper rear extending strut is integral with a carrier frame.

In an alternative form a pin passes through both the collar and seat tube to locate it in the open and closed positions.

Preferably the pivot joints include ball bearings.

The invention also includes a bicycle that includes a folding frame as summarised above.

The invention can be better understood when a preferred embodiment is described in detail, with reference to the accompanying illustrations in which.

DESCRIPTION OF PREFERRED EMBODIMENT

Figure 1:
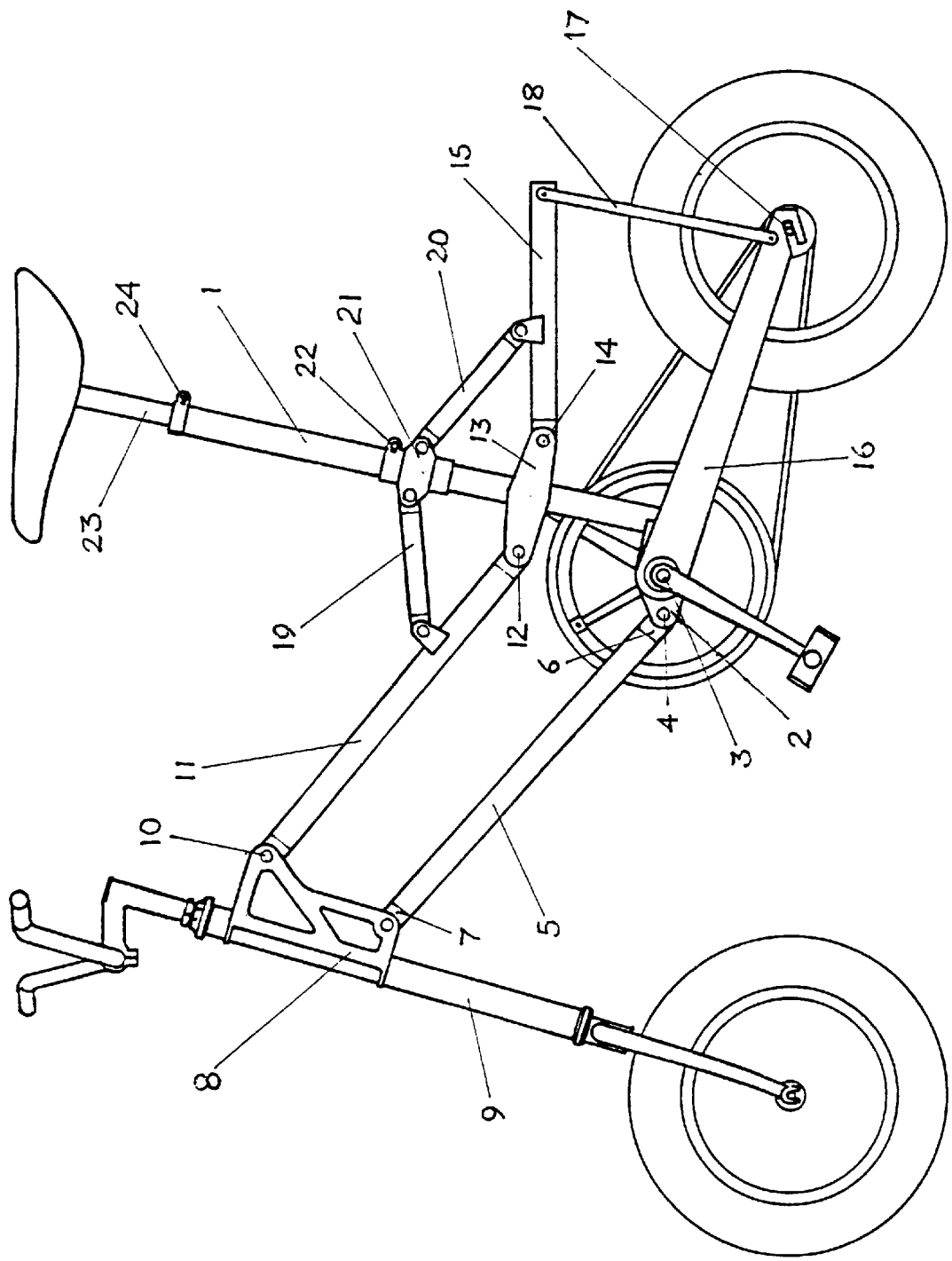
FIG. 1 is a side view of the bicycle frame in the open state.

Referring to FIG. 1, a tubular seat post 1 has at its lower end a forward protrusion 2 comprising two plates welded to the seat post. The plates are welded to a crank axle housing 3, and at their foremost end a pivot assembly 4 captures a lower front strut 5. Preferably this strut is an alloy tube the ends of which have inserts 6 and 7 which are described in more detail later. The front end of the lower strut is pivotally captured by a head bracket 8 comprised of two plates welded to opposing sides of a steering tube 9. An upper part of the head bracket includes an upper pivot 10 from which pivots an upper front tube 11. The lower end of the upper tube is pivotally captured at the front end 12 of a pair of mid-plates 13 which are welded to opposing sides of the seat tube 1. The rear of the mid-plates has a pivot 14 from which an upper rear arm 15 pivots.

A pair of rear extending lower arms 16 pivot about the crank housing 3. These arms can be fashioned from flat plate. At the rear end of the arm, a rear wheel hub 17 is secured in a manner common with most bicycles. Near the rear wheel fixing point, a vertical yolk 18 pivotally connects thereto, being pivotal attached to the upper rear arm 15.

To control the angles of the upper front strut and upper rear arm, linkages 19 and 20 are pivotally attached to the mid-region of the strut and arm. The linkages are connected to a collar 21 which is slidable along the seat post 1. The collar includes a fastening means 22 for securing the position of the collar and thus the position of all the above mentioned struts and arms which indirectly depend from the collar via the linkages 19 and 20.

The seat post includes a telescoping inner tube 23 that is adjustable in height and secured by a fastening clamp 24.

Figure 2:
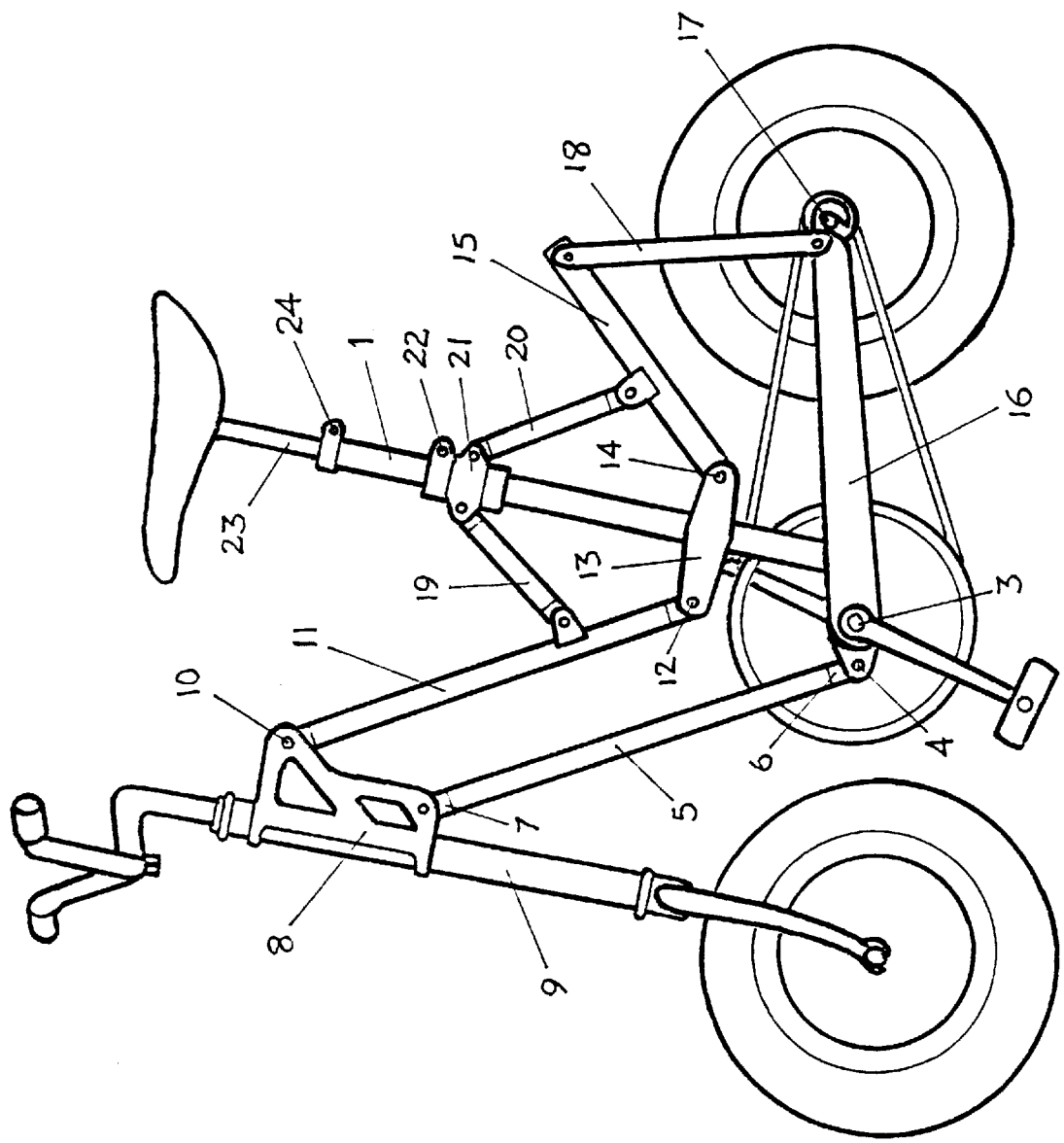
FIG. 2 is a side view of the bicycle in an intermediate state between fully open and fully folded.
Figure 3:
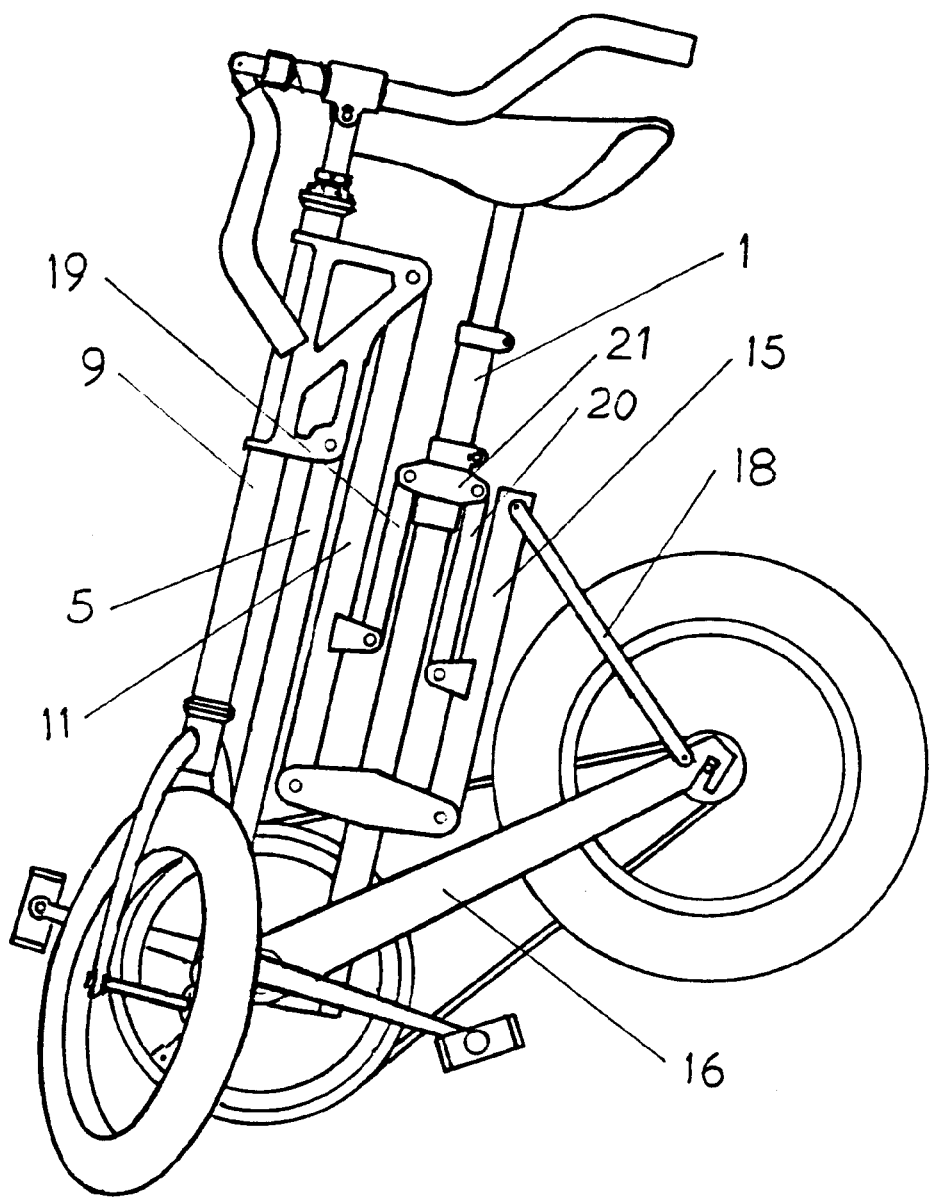
FIG. 3 is a side schematic of the bicycle in the folded state.

By releasing the collar clamp 22 and sliding the collar up the seat post, which can be achieved by pressing the seat post downwards, the frame assumes a partially folded state which is illustrated in FIG. 2. Referring to the figure, collar 21 is positioned half way up the seat post and has raised the forward and rear struts and arms. All the relevant numbered structural members can be identified by referring to the description for FIG. 1. Similarly FIG. 3, shows the bicycle frame in a fully folded state with the identified components corresponding to those described for FIG. 1. It will be clear from the folded geometry that dimensions of all components and their configuration is critical in order to achieve a compact arrangement. The figures provide a reasonable example of a geometry that functions, but obviously there are variations from the dispositions shown that will also provide for a compact folding bicycle.

Preferably the geometry of the axle pivots is configured so as to produce over centers. With such configuration, the frame is relaxed in both the fully folded and fully unfolded position, whereas resistance is experienced during the transition stages.

The struts and arms mentioned can be fashioned from alloy tube having a diameter of about 30–40 mm. Alternatively U sections may be found advantageous, which with appropriate choice of width can allow nesting of the struts and arms when the frame is in the collapsed state. Another variation, would be to have one or more of the struts represented by open frames with interconnecting members. Yet another variation would be to have plastic injection moulded struts made from polypropylene, for example. For lightweight, carbon fibre resins can be employed to advantage.

Strength can be added to weak regions by adding ribs or increasing thicknesses of the components at the weak spot. For example if it was found that the upper struts tended to suffer from fatigue in the region where the connecting linkages 19 and 20 meet the struts, then the side flanges which capture the linkages can be broadened to extend along the struts and welded thereto.

Figure 4:
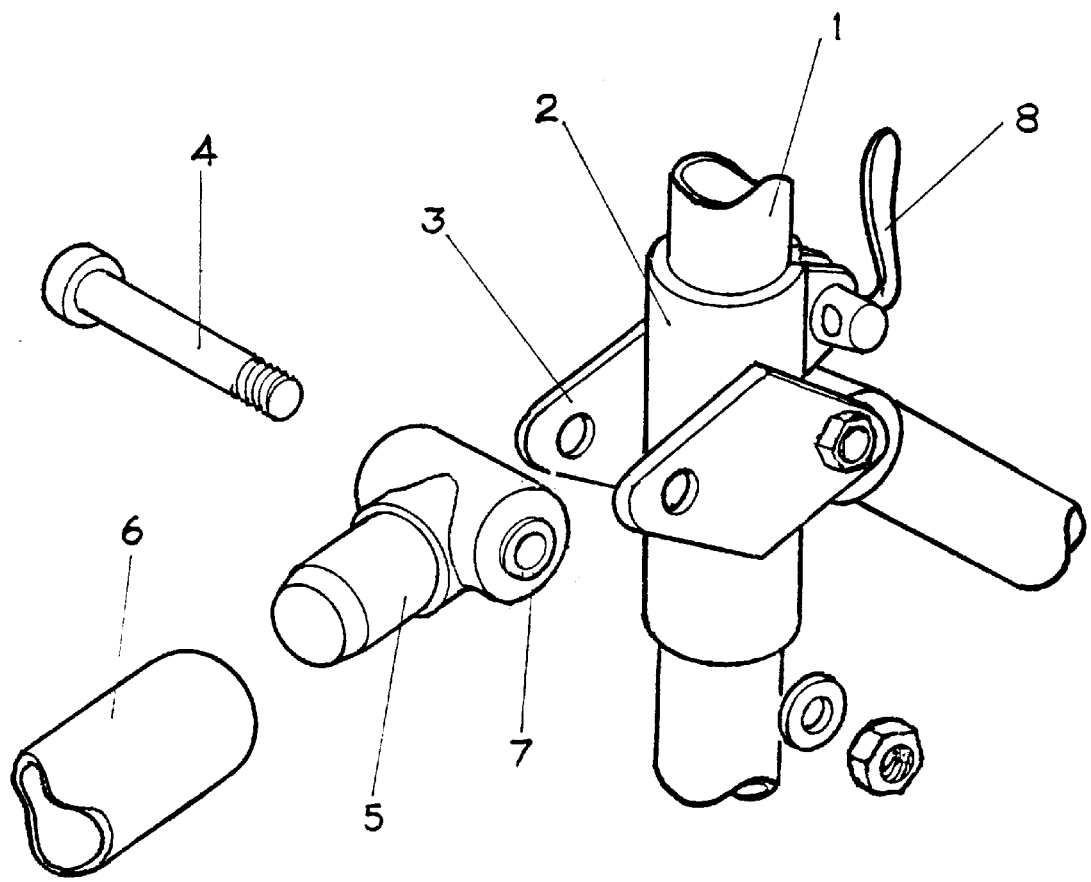
FIG. 4 is an exploded view of the collar and pivot bearing arrangement.

FIG. 4 illustrates the slidable collar, the strut and pivot arrangements in more detail. Referring to the figure, collar 21 surrounds the seat post 1. Flange plates 25 extend from the collar and an axle bolt 26 passes through the flanges and the strut head insert 27. The head insert is made from a plastics or other material such as cast aluminium, and is glued, pinned or brazed to the strut body 28. Preferably a sleeve 24 is freely located into the strut head, this sleeve bearing against the inner faces of the flanges thereby preventing over tightening of the axle bolt. In order to reduce the friction of the joint, a ball-bearing assembly on either side of the sleeve can be incorporated. The upper end of the collar includes a split and a lever operated cam 30 serves to constrict or expand the collar. Such tighteners are commonly found on quick-release components of bicycles.

In order for the frame to be rigid when it is fully deployed, it is important that all the pivot joints are snug fits that do not allow any lateral movement. Broad contact surfaces are desirable to reduce any lateral movement.

The seat post preferably has an extension which can be released or tightened by another lever operated cam, allowing adjustment of the seat height.

Some of the components that are not part of the invention have been omitted from the figures and description. These include brake and gear assemblies, and accessories such as a bag carrier which can be integrated with the upper rear arm. Some components that do not form part of the invention have been omitted from the description. These components include; pedals, handlebars, seats, chains and wheels.

It will be clear from the above description and accompanying drawings that by merely sliding the seat-post collar up and down it is possible to fold and unfold the bicycle frame in a similar action to an umbrella. This embodiment enjoys numerous advantages and benefits over the prior art. Particularly, as no components are disconnected, the time taken to fold or unfold the bicycle is less than 10 seconds.

I claim:

1. A folding bicycle frame characterised by a seat post with upper and lower, front and rear struts pivoted about a lower portion of the seat post, the front end of the front struts being pivotally attached to a steering-head bracket, the lower rear struts accepting a rear wheel and a substantially vertical spar pivotally interconnecting the upper rear strut to the lower rear strut or struts, a collar positionable along an upper portion of the seat post has front and rear connecting linkages that pivotally interconnect between the seat collar and the upper front and rear struts, so that sliding the collar along the seat tube changes the angle of the front and rear struts between open and folded states, and locking said seat collar at its lowermost or uppermost position fixes the frame in an open or folded state respectively.

2. A folding bicycle frame as in claim 1 wherein the collar is tightened using a lever operated cam compressor.

3. A folding bicycle frame as in claim 1 wherein the forward struts are substantially parallel.

4. A folding bicycle frame as in claim 1 wherein one or more of the struts are tubular and incorporate end inserts.

5. A folding bicycle frame according to claim 4 wherein the inserts are formed by molding or casting a setable molten or liquid like substance.

6. A folding bicycle frame according to claim 1 wherein one or more of the pivot joints comprise plates sandwiched outside the respective struts and a bolt passes through both the plates and a hole or bearing in the strut.

7. A folding bicycle frame as in claim 1 wherein the rear upper strut is substantially horizontal when the frame is in the open state.

8. A bicycle which includes a frame according to claim 1.

* * * * *